US011636427B2

(12) United States Patent
Zhang

(10) Patent No.: US 11,636,427 B2
(45) Date of Patent: Apr. 25, 2023

(54) METHOD AND APPARATUS FOR CARRYING SHELF

(71) Applicant: Beijing Jingdong Qianshi Technology Co., Ltd., Beijing (CN)

(72) Inventor: Shumin Zhang, Beijing (CN)

(73) Assignee: Beijing Jingdong Qianshi Technology Co., Ltd., Beijing (CN)

(*) Notice: Subject to any disclaimer, the term of this patent is extended or adjusted under 35 U.S.C. 154(b) by 0 days.

(21) Appl. No.: 17/044,119

(22) PCT Filed: May 7, 2019

(86) PCT No.: PCT/CN2019/085783
§ 371 (c)(1),
(2) Date: Sep. 30, 2020

(87) PCT Pub. No.: WO2019/223527
PCT Pub. Date: Nov. 28, 2019

(65) Prior Publication Data
US 2021/0019696 A1    Jan. 21, 2021

(30) Foreign Application Priority Data
May 25, 2018  (CN) .......................... 201810512219.8

(51) Int. Cl.
*G06Q 10/08* (2012.01)
*G06Q 10/087* (2023.01)

(52) U.S. Cl.
CPC .................. *G06Q 10/087* (2013.01)

(58) Field of Classification Search
CPC .............. G06Q 10/087; G06Q 10/08
See application file for complete search history.

(56) References Cited

U.S. PATENT DOCUMENTS 8,965,562 B1* 2/2015 Wurman ................ B25J 9/1602
700/214
9,111,251 B1* 8/2015 Brazeau ............... B65G 1/1373
(Continued)

FOREIGN PATENT DOCUMENTS

CN        104555222 A  *  4/2015
CN        105637540 A     6/2016
(Continued)

OTHER PUBLICATIONS

Confessore, Giuseppe, Marcello Fabiano, and Giacomo Liotta. "A network flow based heuristic approach for optimising AGV movements." Journal of Intelligent Manufacturing 24.2 (2013): 405-419. (Year: 2013).*
(Continued)

*Primary Examiner* — Nathan A Mitchell
(74) *Attorney, Agent, or Firm* — Blank Rome LLP

(57) ABSTRACT

A method and apparatus for carrying a shelf. One specific implementation of the method comprises: receiving first task information from a task server (104); determining, according to an identifier of a shelf to be transported, the position of a shelf storage space (201) for storing the shelf as a starting point position; determining, according to an identifier of a first picking station, the position of a first buffer storage space in a buffer storage space set corresponding to the first picking station as an ending point position; generating first transporting information according to the determined starting point position and ending point position; and sending the first transporting information to automated guided vehicles (106,107), so that the automated guided vehicles (106,107) transport the shelf.

18 Claims, 8 Drawing Sheets

(56) References Cited

U.S. PATENT DOCUMENTS

| | | | |
|---|---|---|---|
| 9,679,258 B2 | 6/2017 | Mnih et al. | |
| 10,796,278 B1* | 10/2020 | Wintz | G06Q 10/087 |
| 2007/0017984 A1* | 1/2007 | Mountz | G06Q 10/087 |
| | | | 235/385 |
| 2009/0185884 A1* | 7/2009 | Wurman | G06F 7/00 |
| | | | 700/215 |
| 2014/0100999 A1* | 4/2014 | Mountz | G06Q 10/087 |
| | | | 705/28 |
| 2016/0176638 A1* | 6/2016 | Toebes | B65G 1/0492 |
| | | | 700/216 |
| 2016/0229631 A1 | 8/2016 | Kimura et al. | |
| 2017/0091704 A1* | 3/2017 | Wolf | G06Q 10/087 |
| 2017/0121111 A1* | 5/2017 | Hansl | B65G 1/137 |
| 2018/0068255 A1* | 3/2018 | Hance | B65G 61/00 |
| 2019/0177086 A1* | 6/2019 | Mathi | B65G 1/10 |
| 2020/0034780 A1* | 1/2020 | Sikka | G06N 20/00 |
| 2020/0198893 A1* | 6/2020 | Winkler | B65G 1/1373 |
| 2020/0223066 A1* | 7/2020 | Diankov | B25J 9/1664 |
| 2021/0221613 A1* | 7/2021 | Liu | G06Q 10/047 |
| 2021/0395008 A1* | 12/2021 | Zheng | B65G 1/0492 |

FOREIGN PATENT DOCUMENTS

| | | |
|---|---|---|
| CN | 105858045 A | 8/2016 |
| CN | 205998682 U | 3/2017 |
| CN | 107103445 A | 8/2017 |
| CN | 107472787 A | 12/2017 |
| CN | 107628404 A | 1/2018 |
| JP | 2009/073661 A | 4/2009 |
| WO | WO-2007/011814 A2 | 1/2007 |

OTHER PUBLICATIONS

Chan, Felix TS, Hing Kai Chan, and Afshin Kazerooni. "Real time fuzzy scheduling rules in FMS." Journal of intelligent Manufacturing 14.3 (2003): 341-350. (Year: 2003).*

Ioannou, George, and Manolis N. Kritikos. "Optimization of material handling in production and warehousing facilities." Operational Research 4.3 (2004): 317-331. (Year: 2004).*

Bruno, Giuseppe, Gianpaolo Ghiani, and Gennaro Improta. "Dynamic positioning of idle automated guided vehicles." Journal of Intelligent Manufacturing 11.2 (2000): 209-215. (Year: 2000).*

International Search Report for PCT/CN2019/085783, dated Aug. 6, 2019, 2 pages.

European Search Report for EP 19808022.8 dated Jan. 18, 2022, 9 pages.

Chinese Office Action for CN 2018105122198 dated May 7, 2022, 7 pages.

* cited by examiner

METHOD AND APPARATUS FOR CARRYING SHELF

CROSS-REFERENCE TO RELATED APPLICATIONS

The present disclosure is a U.S. National Phase Application of International Application No. PCT/CN2019/085783 tiled May 7, 2019, which claims priority to Chinese Patent Application No. "201810512219.8" tiled on May 25, 2018, the entire contents of which are incorporated herein as a whole.

TECHNICAL FIELD

Embodiments of the present disclosure relate to the field of warehousing and logistics, and specifically to a method and apparatus for transporting a shelf.

BACKGROUND

With the rapid development, of the E-commerce industry, more people are needed to participate in works such as warehouse management, goods picking, and goods transportation. In a warehouse, an AGV (Automated Guided Vehicle) is usually used to transport shelves. The participation of AGV has brought great convenience to the goods picking process. The AGV needs to work with a goods picker to help the picker transport goods.

SUMMARY

Embodiments of the present disclosure propose a method and apparatus for transporting a shelf.

In a first aspect, some embodiments of the present disclosure provide a method for transporting shelf. The method includes: receiving first task information from a task server, the first task information comprising an identifier of a to-be-transported shelf and an identifier of a first picking station for processing the first task information, the to-be-transported shelf being stored in a warehouse, and the warehouse being set with shelf storage spaces, picking stations, and buffer storage space sets corresponding to the picking stations, each buffer storage space set comprising a first buffer storage space; determining, based on the identifier of the to-be-transported shelf, a position of a shelf storage space storing the shelf as a starting position; determining, based on the identifier of the first picking station, a position of a first buffer storage space in a buffer storage space set corresponding to the first picking station as an end position; generating first transporting information, based on the determined starting position and end position; and sending the first transporting information to an automated guided vehicle, so that the automated guided vehicle transports the shelf.

In some embodiments, the sending the first transporting information to the automated guided vehicle, includes: selecting an automated guided vehicle from an idle automated guided vehicle set as a target automated guided vehicle; and sending the first transporting information to the target automated guided vehicle.

In some embodiments, each buffer storage space set further comprises a second buffer storage space; and the method further comprises: determining, in a process of storing the shelf into the first buffer storage space in the buffer storage space set corresponding to the first picking station, whether second task information comprising the identifier of the shelf is received from the task server, wherein the second task information further comprises an identifier of a second picking station for processing the second task information; in response to determining that the second task information is received, determining whether a priority of the second task information is higher than a priority of the first task information; in response to determining that the priority of the second task information is higher than the priority of the first task information, determining the position of the first buffer storage space in the buffer storage space set corresponding to the first picking station as a starting position, and determining, based on the identifier of the second picking station, a position of a second buffer storage space in a buffer storage space set corresponding to the second picking station as an end position; generating second transporting information based on the determined starting position and end position; and sending the second transporting information to the automated guided vehicle.

In some embodiments, the method further includes: in response to determining that the second task information is not received or the priority of the second task information is lower than the priority of the first task information, determining the position of the first buffer storage space in the buffer storage space set corresponding to the first picking station as the starting position, determining a position of a second buffer storage space in the buffer storage space set corresponding to the first picking station as the end position, and generating third transporting information based on the determined starting position and the end position; and sending the third transporting information to the automated guided vehicle.

In some embodiments, the method further includes: in response to determining that the second task information is not received or the priority of the second task information is lower than the priority of the first task information, determining the position of the first buffer storage space in the buffer storage space set corresponding to the first picking station as the starting position, determining a position of a second buffer storage space in the buffer storage space set corresponding to the first picking station as the end position, and generating third transporting information based on the determined starting position and the end position; and sending the third transporting information to the automated guided vehicle.

In some embodiments, the method further includes: in response to determining that information of completing task processing is received from a picking terminal, determining whether third task information comprising the identifier of the shelf is received from the task server in a process of storing the shelf into the second buffer storage space in the buffer storage space set corresponding to the first picking station, wherein the information of completing the task is sent by the picking terminal after completing the processing of the first task information, and the third task information further comprises an identifier of a third picking station for processing the third task information; in response to determining that the third task information is received, determining the position of the second buffer storage space in the buffer storage space set corresponding to the first picking station as a starting position, and determining, based on the identifier of the third picking station, a position of a first buffer storage space in a buffer storage space set corresponding to the third picking station as an end position; generating fourth transporting information based on the determined starting position and end position; and sending the fourth transporting information to the automated guided vehicle.

In some embodiments, the method further includes: in response to determining that the third task information is not received, determining the position of the second buffer storage space in the buffer storage space set corresponding to the first picking station as a starting position, determining the position of the first buffer storage space in the buffer storage space set corresponding to the first picking station as an end position, and generating fifth transporting information based on the determined starting position and end position; and sending the fifth transporting information to the automated guided vehicle.

In some embodiments, the method further includes: determining, in the process of storing the shelf into the first buffer storage space in the buffer storage space set corresponding to the first picking station, whether fourth task information comprising the identifier of the shelf is received; in response to determining that the fourth task information is not received, determining the position of the first buffer storage space in the buffer storage space set corresponding to the first picking station as a starting position, determining the position of the shelf storage space storing the shelf as an end position, and generating sixth transporting information based on the determined starting position and end position; and sending the sixth transporting information to the automated guided vehicle.

In some embodiments, the automated guided vehicle includes a first automated guided vehicle traveling between the shelf storage spaces and buffer storage spaces in the buffer storage space sets; and before sending transporting information to the automated guided vehicle, the method further includes: determining whether one of a starting position and an end position in the transporting information is a position of a shelf storage space; and sending the transporting information to the first automated guided vehicle, in response to determining that one of the starting position and the end position in the to-be-sent transporting information is the position of the shelf storage space.

In some embodiments, the automated guided vehicle further comprises a second automated guided vehicle that travels between buffer storage spaces; and the method further includes: sending the transporting information to the second automated guided vehicle, in response to determining that the starting position and the end position in the to-be-sent transporting information are positions of the buffer storage spaces.

In some embodiments, task information sent by the task server to a server comprises warehouse-in task information and warehouse-out task information, the picking stations set in the warehouse comprise a warehouse-in picking station for processing the warehouse-in task information and a warehouse-out picking station for processing the warehouse-out task information; and the method further includes: determining a number of automated guided vehicles in the warehouse, a number of the warehouse-in picking station, and a number of the warehouse-out picking station; in response to determining that a ratio of the number of the automated guided vehicles to a sum of the number of the warehouse-in picking station and the number of the warehouse-out picking station is greater than a first preset value, determining a number of the first automated guided vehicle traveling between the shelf storage spaces and the buffer storage spaces and a number of the second automated guided vehicle traveling between the buffer storage spaces based on a ratio of the number of the warehouse-in picking station to the number of the warehouse-out picking station and the number of the automated guided vehicles; and in response to determining that the ratio of the number of the automated guided vehicles to the sum of the number of the warehouse-in picking station and the number of the warehouse-out picking station is less than the first preset value, selecting automated guided vehicles of a number equal to the sum of the number of the warehouse-in picking station and the number of the warehouse-out picking station as the second automated guided vehicles traveling between the buffer storage spaces, and allocating the selected automated guided vehicles to the warehouse-in picking station and the warehouse-out picking station.

In some embodiments, the buffer storage space set includes at least one the first buffer storage space; and the method further includes: in response to determining that the third task information is not received, determining whether there is an idle first buffer storage space in the buffer storage space set corresponding to the first picking station; in response to determining that there is no idle first buffer storage space, determining whether there is a picking station in the warehouse meeting a condition as follows: a number of idle first buffer storage spaces in a buffer storage space set corresponding to the packing station is greater than a second preset value; in response to determining that there is the picking station meeting the condition, determining the position of the second buffer storage space in the buffer storage space set corresponding to the first picking station as a starting position, determining a position of a first buffer storage space in a buffer storage space set corresponding to the picking station meeting the condition as an end position, and generating seventh transporting information based on the determined starting position and end position; and sending the seventh transporting information to the automated guided vehicle.

In a second aspect, some embodiments of the present disclosure provide an apparatus for transporting shelf. The apparatus includes: a first task information receiving unit, configured to receive first task information from a task server, the first task information comprising an identifier of a to-be-transported shelf and an identifier of a first picking station for processing the first task information, the to-be-transported shelf being stored in a warehouse, and the warehouse being set with shelf storage spaces, picking stations, and buffer storage space sets corresponding to the picking stations, each buffer storage space set comprising a first buffer storage space; a starting position determination unit, configured to determine, based on the identifier of the to-be-transported shelf, a position of a shelf storage space storing the shelf as a starting position; an end position determination unit, configured to determine, based on the identifier of the first picking station, a position of a first buffer storage space in a buffer storage space set corresponding to the first picking station as an end position; a first transporting information generation unit, configured to generate first transporting information, based on the determined starting position and the end position; and a first transporting information sending unit, configured to send the first transporting information to an automated guided vehicle, so that the automated guided vehicle transports the shelf.

In some embodiments, the first transporting information sending unit is further configured to: select an automated guided vehicle from an idle automated guided vehicle set as a target automated guided vehicle; and send the first transporting information to the target automated guided vehicle.

In some embodiments, each buffer storage space set further comprises a second buffer storage space; and the apparatus further includes: a second task information receiving unit, configured to determine, in a process of storing the shelf into the first buffer storage space in the buffer storage space set corresponding to the first picking station, whether second task information comprising the identifier of the shelf is received from the task server, wherein the second task information further comprises an identifier of a second picking station for processing the second task information; a priority determination unit, configured to determine, in response to determining that the second task information is received, whether a priority of the second task information is higher than a priority of the first task information; a second transporting information generation unit, configured to determine, in response to determining that the priority of the second task information is higher than the priority of the first task information, the position of the first buffer storage space in the buffer storage space set corresponding to the first picking station as a starting position, and determine, based on the identifier of the second picking station, a position of a second buffer storage space in a buffer storage space set corresponding to the second picking station as an end position; generate second transporting information based on the determined starting position and end position; and a second transporting information sending unit, configured to send the second transporting information to the automated guided vehicle.

In some embodiments, the apparatus further includes: a third transporting information generation unit, configured to determine, in response to determining that the second task information is not received or the priority of the second task information is lower than the priority of the first task information, the position of the first buffer storage space in the buffer storage space set corresponding to the first picking station as the starting position, determine a position of a second buffer storage space in the buffer storage space set corresponding to the first picking station as the end position, and generate third transporting information based on the determined starting position and the end position; and a third transporting information sending unit, configured to send the third transporting information to the automated guided vehicle.

In some embodiments, the apparatus further includes: a third task information receiving unit, configured to determine, in response to determining that information of completing task processing is received from a picking terminal, whether third task information comprising the identifier of the shelf is received from the task server in a process of storing the shelf into the second buffer storage space in the buffer storage space set corresponding to the first picking station, wherein the information of completing the task is sent by the picking terminal after completing the processing of the first task information, and the third task information further comprises an identifier of a third picking station for processing the third task information; a fourth transporting information generation unit, configured to determine, in response to determining that the third task information is received, the position of the second buffer storage space in the buffer storage space set corresponding to the first picking station as a starting position, and determine a position of a first buffer storage space in a buffer storage space set corresponding to the third picking station as the end position based on the identifier of the third picking station; generate fourth transporting information based on the determined starting position and end position; and a fourth transporting information sending unit, configured to send the fourth transporting information to the automated guided vehicle.

In some embodiments, the apparatus further includes: a fifth transporting information generation unit, configured to determine, response to determining that the third task information is not received, the position of the second buffer storage space in the buffer storage space set corresponding to the first picking station as a starting position, determine the position of the first buffer storage space in the buffer storage space set corresponding to the first picking station as an end position, and generate fifth transporting information based on the determined starting position and end position; and a fifth transporting information sending unit, configured to send the fifth transporting information to the automated guided vehicle.

In some embodiments, the apparatus further includes: a fourth task information receiving unit, configured to determine, in the process of storing the shelf into the first buffer storage space in the buffer storage space set corresponding to the first picking station, whether fourth task information comprising the identifier of the shelf is received; a sixth transporting information generation unit, configured to determine, in response to determining that the fourth task information is not received, the position of the first buffer storage space in the buffer storage space set corresponding to the first picking station as the starting position, determine the position of the shelf storage space storing the shelf as an end position, in response to determining that the fourth task information is not received, and generate sixth transporting information based on the determined starting position and end position; and a sixth transporting information sending unit, configured to send the sixth transporting information to the automated guided vehicle.

In some embodiments, the automated guided vehicle comprises a first automated guided vehicle traveling between the shelf storage spaces and buffer storage spaces in the buffer storage space sets; and the apparatus further includes: a position determination unit, configured to determine whether one of a starting position and an end position in the transporting information is a position of shelf storage space; and a first automated guided vehicle determination unit, configured to send the transporting information to the first automated guided vehicle, in response to determining that one of the starting position and the end position in the to-be-sent transporting information is the position of the shelf storage space.

In some embodiments, the automated guided vehicle further comprises a second automated guided vehicle traveling between buffer storage spaces; and the apparatus further includes: a second automated guided vehicle determination unit, configured to send the transporting information to the second automated guided vehicle, in response to determining that the starting position and the end position in the to-be-sent transporting information are positions of the buffer storage spaces.

In some embodiments, the task information sent by the task server to a server comprises warehouse-in task information and warehouse-out task information, the picking stations set in the warehouse comprise a warehouse-in picking station for processing the warehouse-in task information and an warehouse-out picking station for processing the warehouse-out task information; and the apparatus further includes: a number determination unit, configured to determine a number of automated guided vehicles in the warehouse, a number of the warehouse-in picking station, and a number of the warehouse-out picking station; a first allocation unit, configured to determine, in response to determining that a ratio of the number of the automated guided vehicles to a sum of the number of the warehouse-in picking station and the number of the warehouse-out picking station is greater than a first preset value, a number of the first automated guided vehicle traveling between the shelf storage spaces and the buffer storage spaces and a number of the second automated guided vehicle traveling between the buffer storage spaces based on a ratio of the number of the warehouse-in picking station to the number of the warehouse-out picking station and the number of the automated guided vehicles; and a second allocation unit, configured to select, in response to determining that the ratio of the number of the automated guided vehicles to the sum of the number of the warehouse-in picking station and the number of the warehouse-out picking station is less than the first preset value, automated guided vehicles of a number equal to the sum of the number of the warehouse-in picking station and the number of the warehouse-out picking station as the second automated guided vehicles traveling back and forth between the buffer storage spaces, and allocate the selected automated guided vehicles to the warehouse-in picking station and the warehouse-out picking station.

In some embodiments, the buffer storage space set comprises at least one the first buffer storage space; and the method further includes: an idle buffer storage space determination unit, configured to determine, in response to determining that the third task information is not received, whether there is an idle first buffer storage space in the buffer storage space set corresponding to the first picking station; an idle buffer storage space selection unit, configured to determine, in response to determining that there is no idle first buffer storage space, whether there is a picking station in the warehouse meeting a condition as follows: a number of idle first buffer storage spaces in a buffer storage space set corresponding to the picking station is greater than a second preset value; a seventh transporting information generation unit, configured to determine, in response to determining that there is the picking station meeting the condition, the position of the second buffer storage space in the buffer storage space set corresponding to the first picking station as a starting position, determine a position of a first buffer storage space in a buffer storage space set corresponding to the picking station meeting the condition as an end position, and generate seventh transporting information based on the determined starting position and end position; and a seventh transporting information sending unit, configured to send the seventh transporting information to the automated guided vehicle.

In a third aspect, some embodiments of the present disclosure provide a server, the server includes: one or more processors; and a storage apparatus, storing one or more programs thereon, the one or more programs, when executed by the one or more processors, cause the one or more processors to implement the method according to any one of the embodiments in the first aspect.

In a fourth aspect, some embodiments of the present disclosure provide a computer readable medium, storing a computer program thereon, the program, when executed by a processor, implements the method according to any one of the embodiments in the first aspect.

The method and apparatus for controlling shelf transporting provided by embodiments of the present disclosure, after receiving the first task information from the task server, may determine, based on the identifier of the to-be-transported shelf, the position of the shelf storage space storing the shelf as the starting position, then determine, based on the identifier of the first picking station, the position of the first buffer storage space in the buffer storage space set corresponding to the first picking station as the end position, generate the first transporting information based on the starting position and end position, and send the generated first transporting information to the automated guided vehicle, so that the automated guided vehicle transports the shelf. In the method and apparatus of the present embodiment, by setting the buffer storage spaces in the warehouse, a transporting route is discomposed into a plurality of sections, so that the automated guided vehicle may be more fully used.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the some embodiments in the present disclosure and some features in the disclosure may be combined with each other on a non-conflict basis. Features of the present disclosure will be described below in detail with reference to the accompanying drawings and in combination with embodiments.

Figure 1:
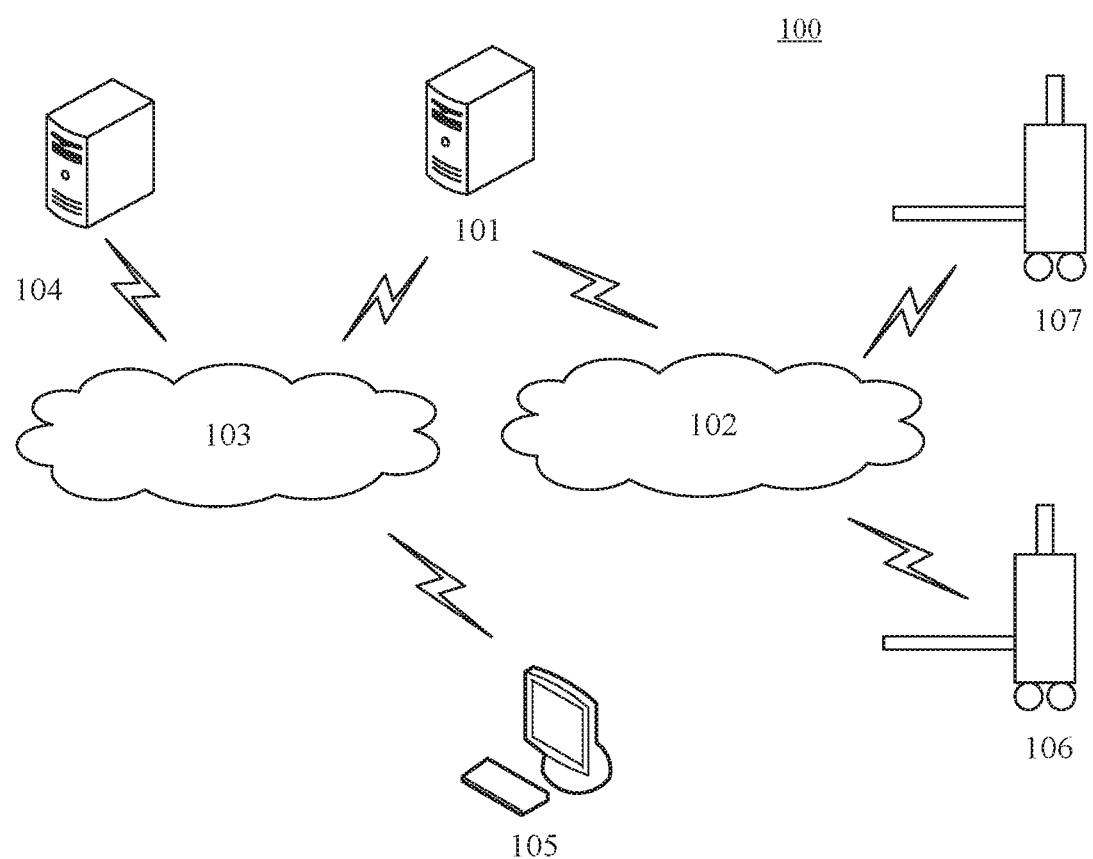
FIG. 1 is a diagram of an exemplary system architecture in which embodiments of the present disclosure may be implemented.

FIG. 1 illustrates an exemplary system architecture 100 in which a method for controlling shelf transporting or an apparatus for controlling shelf transporting according to embodiments of present disclosure may be implemented.

As shown in FIG. 1, the system architecture 100 may include a server 101, a network 102, 103, a task server 104, a picking terminal 105 and automated guided vehicles 106 and 107. The network 102 is used to provide a communication link medium between the automated guided vehicles 106 and 107 and the server 101. The network 103 is used to provide a communication link medium between the picking terminal 105 and the server 101, and between the server 101 and the task server 104. The network 102, 103 may include various types of connections, such as wired, wireless communication links, or optic fibers.

The task server 104 may interact with the server 101 via the network 103 to receive or send messages, and the like. The task server 104 may be a server that provides various services, for example, it may be a server that sends task information to the server 101. The task information may include an identifier of a to-be-transported shelf, and may also include an identifier of a picking station that processes the task information. Of course, the task information may also include an identifier and quantity of to-be-picked goods. Various communication client applications may be installed on the task server 104, such as web browser applications, shopping applications, search applications, instant messaging tools, email clients, and social platform software.

The server 101 may receive task messages from the task server 104 via the network 103, and may also acquire information of the automated guided vehicles 106 and 107 via the network 102. The server 101 may be a server that provides various services, for example, it may be a server that analyzes the task information sent by the task server 104. After receiving the receiving the task information sent by the task server 104, the server 101 may send the task information to the automated guided vehicles 106 and 107. Various communication client applications may be installed on the server 101, such as web browser applications, shopping applications, search applications, instant messaging tools, email clients, and social platform software.

The picking staff may interact with the server 101 or the task server 104 through the picking terminal 105. The task information sent by the task server 104 is processed by the picking staff, and the picking staff may send a message to the server 101 or the task server 104 after the processing is completed. For example, after completing the update of the goods (shelf-on or shelf-off) on the shelf, the picking staff may send an update completed message to the task server 104 through the picking terminal 105. Various communication client applications may be installed on the picking terminal 105, such as web browser applications, shopping applications, search applications, instant messaging tools, email clients, and social platform software.

The automated guided vehicles 106 and 107 may also be equipped with communication apparatuses to interact with the server 101. The automated guided vehicles 106 and 107 may receive transporting information sent by the server 101 to transport a designated shelf to a designated location. The automated guided vehicles 106 and 107 may be equipped with positioning apparatuses, and may send current location information to the server 101.

It should be noted that the picking terminal 105 may be hardware or software. When the picking terminal 105 is hardware, it may be various electronic devices having display screens and supporting information interaction, including but not limited to smart phones, tablet computers, palmtop computers, laptop portable computers and desktop computers, etc. When the picking terminal 105 is software, it may be installed in the above-listed electronic devices, it may be implemented as a plurality of software or software modules (for example, for providing distributed services) or as a single software or software module, which is not specifically limited herein.

It should be noted that the server 101, the task server 104 may be hardware or software. When the server 101, the task server 104 are hardware, they may be implemented as a distributed server cluster composed of a plurality of servers, or as a single server. When the server 101, the task server 104 are software, they may be implemented as a plurality of software or software modules (for example, for providing distributed services) or as a single software or software module, which is not specifically limited herein.

In addition, the method for controlling shelf transporting provided by embodiments of the present disclosure is generally performed by the server 101. Accordingly, the apparatus for controlling shelf transporting is generally disposed in the server 101.

It should be understood that the number of servers, networks, task servers, packing terminals and automated guided vehicles in FIG. 1 is merely illustrative. Depending on the implementation needs, there may be any number of servers, networks, task servers, picking terminals and automated guided vehicles.

Figure 2:
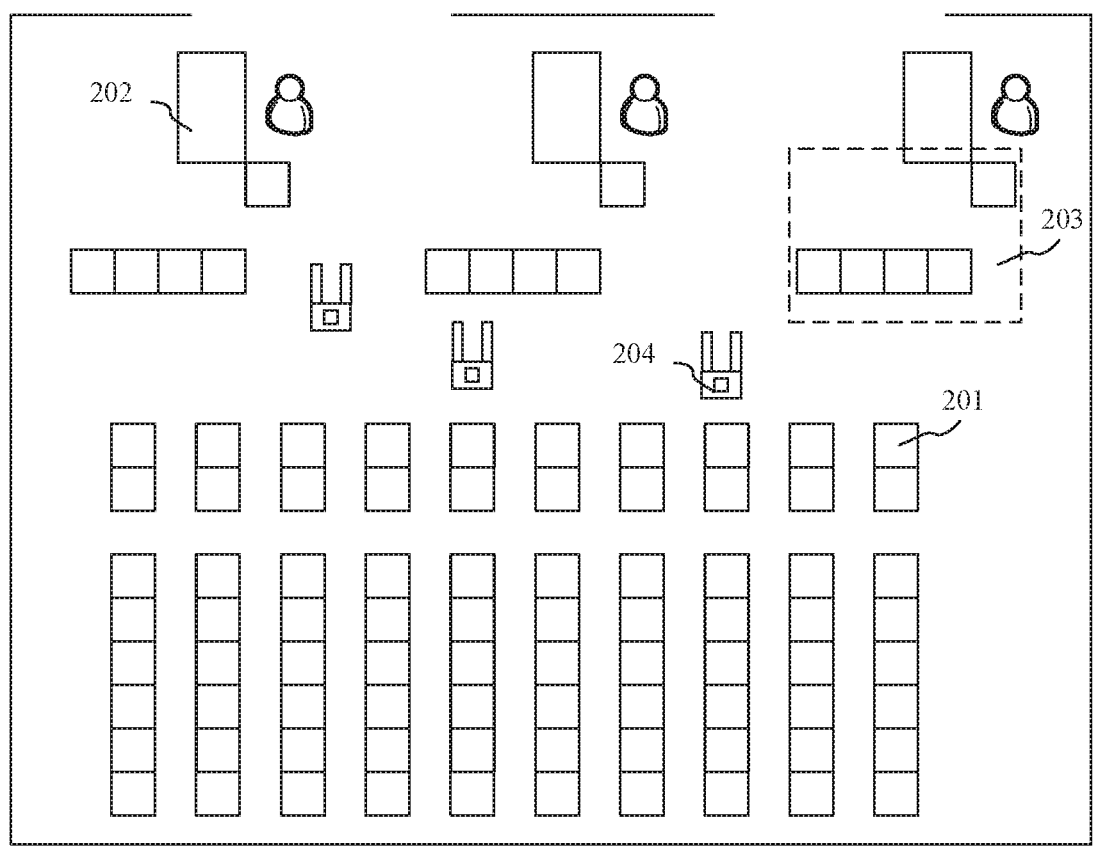
FIG. 2 is a schematic diagram of a layout of a warehouse of the present disclosure.

FIG. 2 illustrates a schematic diagram of a layout of a warehouse of the present disclosure. As shown in FIG. 2, the warehouse may be provided with a plurality of shelf storage spaces 201, picking stations 203, and buffer storage space sets 202 corresponding to the picking stations. The plurality of shelf storage spaces 201 are used to store shelves, and there are passages for automated guided vehicles to travel between the shelf storage spaces. The picking stations 203 may be arranged in the peripheral area in the warehouse, for example, may be arranged at a position close to the door of the warehouse, so as to facilitate warehouse-in and warehouse-out. The picking staff may operate (shelf-on or shelf-off) on the goods on the shelf at the picking stations 203. Each picking station 203 corresponds to a buffer storage space set 202. The buffer storage space set 202 may include a plurality of buffer storage spaces therein, and the buffer storage spaces may include a first buffer storage space. The function of the buffer storage space is to store a to-be-transported shelf for a short time. After the picking staff completes the operation on the goods on the shelf, the automated guided vehicle may transport the shelf to other positions.

Figure 3:
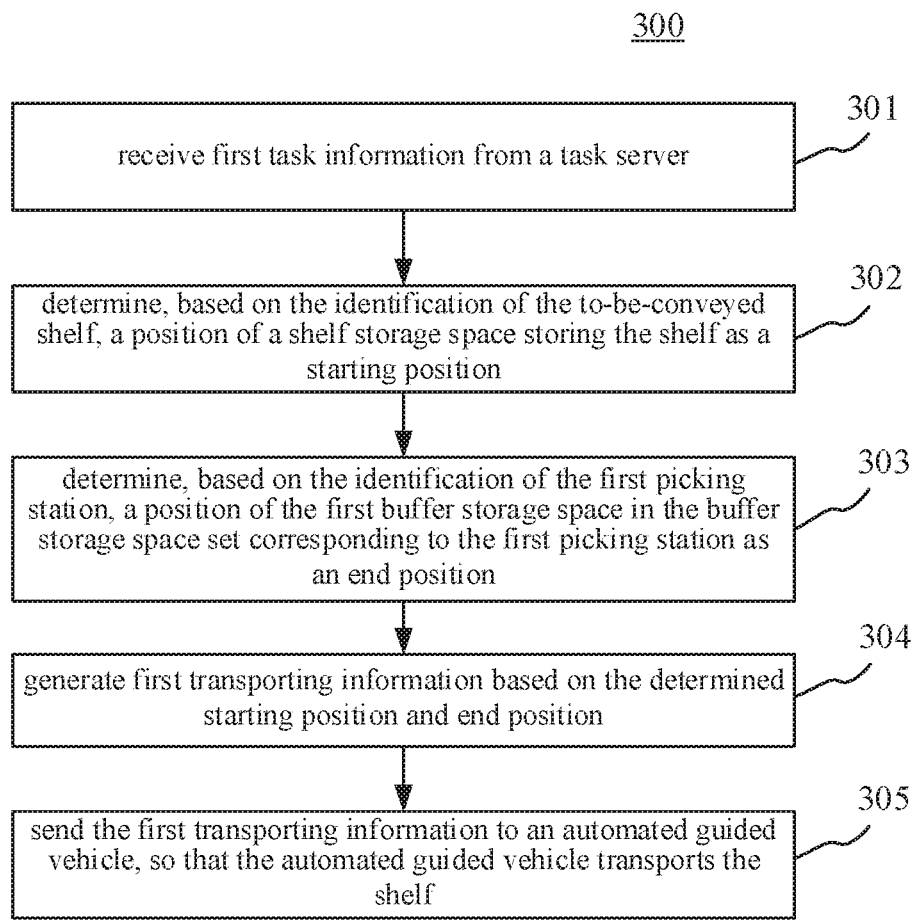
FIG. 3 is a flowchart of a method for controlling shelf transporting according to an embodiment of the present disclosure.

With further reference to FIG. 3, a flow 300 of a method for controlling shelf transporting according to an embodiment of the present disclosure is illustrated. The method for controlling shelf transporting includes the following steps:

Step 301, receiving first task information from a task server.

In the present embodiment, the executing body (for example, the server 101 shown in FIG. 1) of the method for controlling shelf transporting may receive the first task information from the task server (for example, the task server 104 shown in FIG. 1) through a wired or wireless connection. The task server refers to a server that generates task information, which may generate task information based on order information generated by a user, or based on goods supplementary information. The goods supplementary information may be determined based on the number of the goods stored in the warehouse, by the warehouse staff. Then, the first task information may include an identifier of a to-be-transported shelf and an identifier of a first picking station for processing the first task information. The identifier of the to-be-transported shelf may be determined based on the position of the shelf storage space in the warehouse, or based on the type of the goods stored on the shelf. The identifier of the first picking station may be represented by any character string.

The to-be-transported shelf is stored in the warehouse, and the warehouse may be a warehouse based on goods-to-person model (i.e., the warehouse shown in FIG. 2), which is also called a goods-to-person warehouse. The goods-to-person warehouse may be understood as: a warehouse where goods on the shelves are transported to the picking station by AGV (automated guided vehicle), and an order is completed by manually picking goods at the picking station. The warehouse may be equipped with shelf storage spaces, picking stations, and buffer storage space sets corresponding to the picking stations. Here, the shelf storage space is used to store a shelf, the picking station is used for the picking staff to pick the goods on the shelf, and the buffer storage space in the buffer storage space set is used to store the shelf containing the goods to be picked by the picking staff. The buffer storage space set includes a first buffer storage space. The first buffer storage space is used to store the shelf to be picked by the picking staff. When a given picking station needs to pick goods on a plurality of shelves, the automated guided vehicle may store the transported shelves in the first buffer storage space.

It should be noted that the above wireless connection may include but, is not limited to 3G/4G connection, WiFi connection, Bluetooth connection, IMAX connection, Zigbee connection, UWB (ultra wideband) connection, and other wireless connection currently known or developed in the future.

Step 302, determining, based on the identifier of the to-be-transported shelf, a position of a shelf storage space where the shelf is stored as a starting position, based on the identifier of the to-be-transported shelf.

After receiving the first task information, the executing body may determine, based on the identifier of the to-be-transported shelf in the first task information, the position of the shelf storage space where the to-be-transported shelf is stored in the warehouse, and then determine the position as the starting position. It may be understood that, in the present embodiment, the executing body may pre-store a corresponding relationship between the identifier of the shelf and the position of the shelf storage space.

Step 303, determining, based on the identifier of the first picking station, a position of a first buffer storage space in the buffer storage space set corresponding to the first picking station as an end position.

After receiving the first task information, the executing body may determine the position of the first picking station based on the identifier of the first picking station in the first task information. Then, the position of the first buffer storage space in the buffer storage space set corresponding to the first picking station is set as the end position. It may be understood that, when the buffer storage space set includes a plurality of first buffer storage space sets, the executing body may use the position of any idle first buffer storage space in the plurality of first buffer storage spaces as the end position, and may also use the position of the first buffer storage space closest to the picking station in the plurality of first buffer storage spaces as the end position.

Step 304, generating first transporting information based on the determined starting position and end position.

After determining the starting position and the end position, the executing body may encapsulate the starting position and the end position to generate the first transporting information.

Step 305, sending the first transporting information to an automated guided vehicle, so that the automated guided vehicle transports the shelf.

After generating the first transporting information, the executing body may send the first transporting information to an automated guided vehicle, so that the automated guided vehicle may transport the shelf from the starting position to the end position after receiving the first transporting information. It may be understood that, when there are a plurality of automated guided vehicles in the warehouse, the first transporting information may be sent to any automated guided vehicle.

In some alternative implementations of the present embodiment, the step 305 may specifically include steps not shown in FIG. 3 as follows: first, selecting an automated guided vehicle from an idle automated guided vehicle set as a target automated guided vehicle. Then, sending the first transporting information to the target automated guided vehicle.

There may be a plurality of automated guided vehicles in the warehouse, and some automated guided vehicles may be transporting shelves, that is, in an occupied status. In this regard, the executing body may select an automated guided vehicle from the idle automated guided vehicle set as a target automated guided vehicle. Then, the first transporting information is sent to the target automated guided vehicle. In this way, it is avoided that the first transporting information is sent to an automated guided vehicle that is transporting a shelf, and the transporting efficiency of shelf may be effectively improved. In practice, the server may acquire status information of each automated guided vehicle in real time, and the status information may include an occupied status and an idle status. The server may also acquire location information of each automated guided vehicle in real time. In this way, combining the status information and the location information, an idle automated guided vehicle closest to the starting position may be selected to transport the shelf. On the one hand, it may reduce a traveling distance of the automated guided vehicle, reduce power consumption, and extend the working time of the automated guided vehicle; on the other hand, it may improve the efficiency of transporting shelf.

Figure 4:
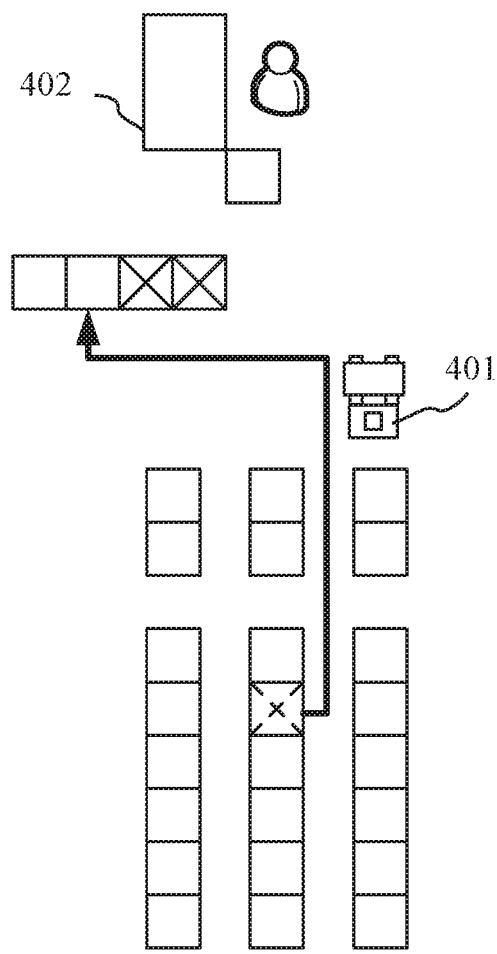
FIG. 4 is a schematic diagram of an application scenario of the method for controlling shelf transporting according to an embodiment of the present disclosure.

With further reference to FIG. 4, FIG. 4 is a schematic diagram of an application scenario of the method for controlling shelf transporting according to the present embodiment. In the application scenario of FIG. 4, after a task server sends task information to a server, the server determines a starting position (in the figure, the position of the shelf storage space including dashed line) and an end position (the position indicated by the arrow) based on the identifier of the shelf and the identifier of a picking station in the task information. Then, the starting position and the end position are encapsulated to obtain transporting information to send to the automated guided vehicle 401. After receiving the transporting information, the automated guided vehicle 401 transports the shelf from the starting position to the end position. The staff at a picking station 402 may sequentially process the goods stored on the shelf.

The method for controlling shelf transporting provided by the above embodiments of the present disclosure, after receiving the first task information from the task server, the position of the shelf storage space where the shelf is stored may be determined as the starting position based on the identifier of the to-be-transported shelf, then the position of the first buffer storage space in the buffer storage space set corresponding to the first picking station may be determined as the end position based on the identifier of the first picking station, the first transporting information may be generated based on the starting position and the end position, and the generated first transporting information is sent to the automated guided vehicle, so that the automated guided vehicle transports the shelf. In the method of the present embodiment, by setting buffer storage spaces in the warehouse, a transporting route is decomposed into a plurality of sections, so that the automated guided vehicle may be more fully used.

Figure 5:
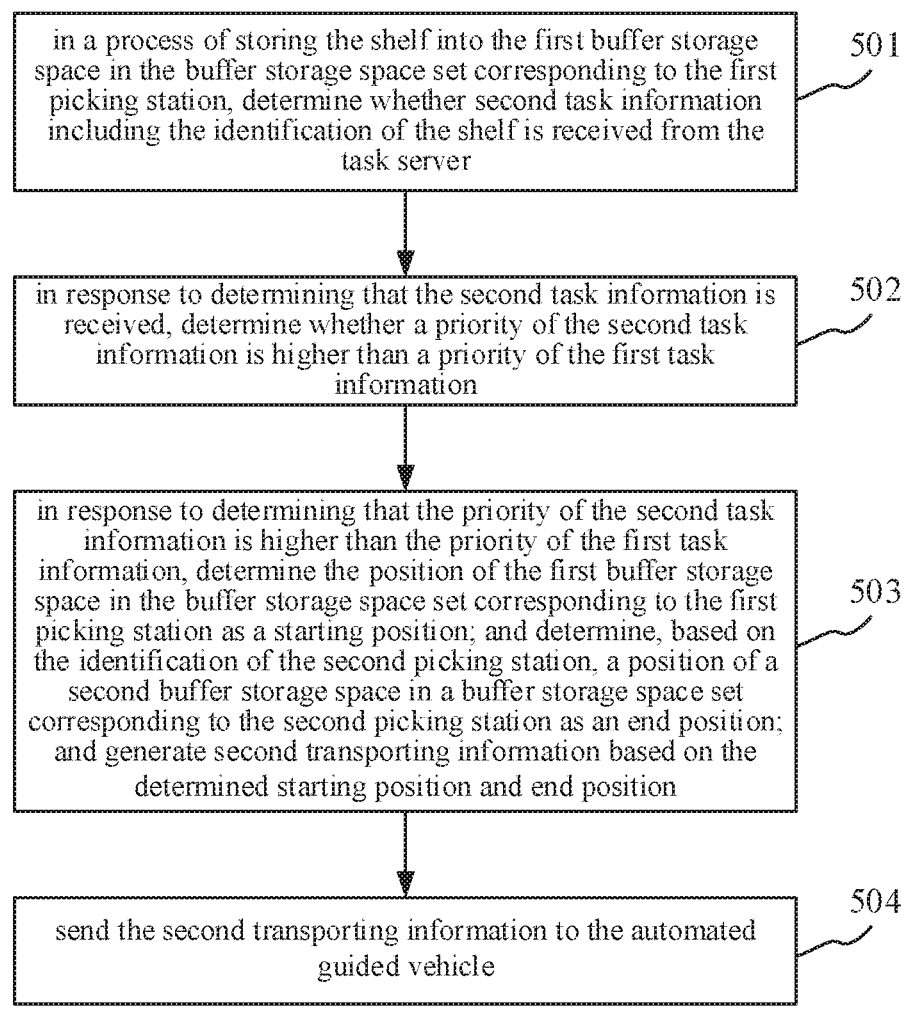
FIG. 5 is a flowchart of a method for controlling shelf transporting according to another embodiment of the present disclosure.

With further reference to FIG. 5, a flow 500 of the method for controlling shelf transporting according to another embodiment of the present disclosure is illustrated. In the present embodiment, the buffer storage space set may further include a second buffer storage space. When the picking station needs to store goods onto the shelf or pick goods off the shelf, the automated guided vehicle may transport the shelf to the second buffer storage space. In order to facilitate the operation of the picking staff, the second buffer storage space may be set at a close position around the picking station.

As shown in FIG. 5, the method for controlling shelf transporting in the present embodiment may further include the following steps after step 305 in FIG. 3:

Step 501, determining, in a process of storing the shelf into the first buffer storage space in the buffer storage space set corresponding to the first picking station, whether second task information including the identifier of the shelf is received from the task server.

In the process of the automated guided vehicle transports and stores the shelf to the first buffer storage space in the buffer storage space set corresponding to the first picking station, the executing body may determine whether second task information is received from the task server. The second task information may include the identifier of the above shelf and an identifier of a second picking station for processing the second task information. It may be understood that, the second picking station may be the same as or different from the first picking station.

Step 502, determining whether a priority of the second task information is higher than a priority of the first task information, in response to determining that the second task information is received.

If the executing body receives the second task information, it determines whether the priority of the second task information is higher than the priority of the first task information. In the present embodiment, during the judgment, the executing body may first acquire priority information of the task information from the task server, and then determine whether the priority of the second task information is higher than the priority of the first task information based on the acquired priority information. Alternatively, the executing body may determine priority levels based on the type of the task information. The task information may include different types of task information, for example, it may include warehouse-out task information and warehouse-in task information, and the executing body may preset that the priority of the warehouse-out task information is greater than the priority of the warehouse-in task information.

Step 503, in response to determining that the priority of the second task information is higher than the priority of the first task information, determining the position of the first buffer storage space in the buffer storage space set corresponding to the first picking station as a starting position, and determining, based on the identifier of the second picking station, a position of a second buffer storage space in a buffer storage space set corresponding to the second picking station as an end position; and generating second transporting information based on the determined starting position and end position.

If the executing body determines that the priority of the second task information is higher than the priority of the first task information, the second task information needs to be processed first. That is, in this case, it is necessary for the automated guided vehicle to transport the shelf to the second picking station, so that the picking staff at the second picking station are given priority to process the second task information. In this regard, the position of the first buffer storage space in the buffer storage space set corresponding to the first picking station may be the starting position. Then, based on the identifier of the second picking station in the second task information, the position of the second picking station is determined, and the position of the second buffer storage space in the buffer storage space set corresponding to the second picking station is determined as the end position. Finally, the starting position and the end position are encapsulated into the second transporting information.

Step 504, sending the second transporting information to the automated guided vehicle.

After generating the second transporting information, the executing body may send the second transporting information to an automated guided vehicle. After receiving the second transporting information, the automated guided vehicle may transport the shelf from the starting position to the end position. It may be understood that, the automated guided vehicle here may be the same as or different from the automated guided vehicle in the embodiment shown in FIG. 3. The present embodiment does not make any limitation herein.

In some alternative implementations of the present embodiment, after the process on the second task information is completed, the executing body may use the position of the second buffer storage space in the buffer storage space set corresponding to the second picking station as a starting position, and use the position of the first buffer storage space in the buffer storage space set corresponding to the first picking station as an end position. Then, based on the starting position and the end position, transporting information is generated and sent to an automated guided vehicle. The automated guided vehicle may transport the shelf back to the first picking station, so that the first task information continues to be processed.

It may be understood that, when a buffer storage space set includes a plurality of first buffer storage spaces, it is possible that other first buffer rage spaces have already stored with shelves, and the above shelf may be stored in a first buffer storage space that is farther from the picking station subsequent the first buffer storage spaces where the shelves are stored, so as to wait in line for being processed.

In some alternative implementations of the present embodiment, the method further includes the following steps not shown in FIG. 5: in response to determining that the second task information is not received or the priority of the second task information is lower than the priority of the first task information, determining the position of the first buffer storage space in the buffer storage space set corresponding to the first picking station as a starting position, determining a position of a second buffer storage space in the buffer storage space set corresponding to the first picking station as an end position; generating third transporting information based on the determined starting position and the end position; and sending the third transporting information to an automated guided vehicle.

When the executing body does not receive second task information or the executing body determines that the priority of the second task information is lower than the priority of the first task information, the executing body continues to process the first task information. In this regard, the position of the first buffer storage space in the buffer storage space set corresponding to the first picking station may be determined as a starting position, and the position of the second buffer storage space in the buffer storage space set corresponding to the first picking station may be determined as an end position. Then, the starting position and the end position are encapsulated to generate the third transporting information. Then, the third transporting information is sent to an automated guided vehicle, so that the automated guided vehicle transports the shelf from the starting position to the end position.

In some alternative implementations of the present embodiment, the picking staff may interact with the server using a picking terminal (such as the picking terminal 105 in FIG. 1). The above method also includes the following steps not shown in FIG. 5: in response to determining that information of completing task processing is received from a picking terminal, determining whether third task information including the identifier of the above shelf is received from the task server in a process of storing the shelf into the second buffer storage space corresponding to the first picking station; in response to determining that the third task information is received, determining the position of the second buffer storage space in the buffer storage space set corresponding to the first picking station as a starting position, and determining a position of a first buffer storage space in a buffer storage space set corresponding to the third picking station as an end position based on the identifier of the third picking station; generating fourth transporting information based on the determined starting position and the end position; and sending the fourth transporting information to the automated guided vehicle.

In the present implementation, after the processing on the first task information is completed, the picking staff may send the information of completing the task to the executing body through the picking terminal to indicate that process of the first task information has been completed. After receiving the information of completing the task, the executing body may determine whether third task information including the identifier of the above shelf is received from the task server in the process of storing the above shelf into the second buffer storage space in the buffer storage space set corresponding to the first picking station. Here, the third task information may further include the identifier of the third picking station for processing the third task information.

If the executing body receives the third task information, it may send the fourth transporting information to an automated guided vehicle, so that the automated guided vehicle directly transports the shelf to the position of the first buffer storage space in the buffer storage space set corresponding to the third picking station. That is, the executing body may use the position of the second buffer storage space corresponding to the first picking station as the starting position, and determine the position of the first buffer storage space in the buffer storage space set corresponding to the third picking station as the end position. The starting position and the end position are encapsulated into the fourth transporting information.

In some alternative implementations of the present embodiment, the above method also includes the following steps not shown in FIG. 5: in response to determining that the third task information is not received, determining the position of the second buffer storage space in the buffer storage space set corresponding to the first picking station as the starting position, determining the position of the first buffer storage space in the buffer storage space set corresponding to the first picking station as the end position; generating fifth transporting information based on the determined starting position and the end position; and sending the fifth transporting information to the automated guided vehicle.

If the executing body does not receive the third task information after receiving the information of completing the task, it needs to return the shelf from the second buffer storage space in the buffer storage space set corresponding to the current picking station to the first buffer storage space. That is, the position of the second buffer storage space in the buffer storage space set corresponding to the first picking station is determined as the starting position, and the position of the first buffer storage space in the buffer storage space set corresponding to the first picking station is determined as the end position. Then, the starting position and the end position are encapsulated into the fifth transporting information. The fifth transporting information is sent to the automated guided vehicle.

In some alternative implementations of the present embodiment, the above method also includes the following steps not shown in FIG. 5: determining, in the process of storing the shelf into the first buffer storage space in the buffer storage space set corresponding to the first picking station, whether fourth task information including the identifier of the shelf is received; in response to determining that the fourth task information is not received, determining the position of the first buffer storage space in the buffer storage space set corresponding to the first picking station as the starting position, determining the position of the shelf storage space where the shelf is stored as the end position; generating sixth transporting information based on the determined starting position and the end position; and sending the sixth transporting information to the automated guided vehicle.

When the shelf is returned back to the first buffer storage space in the buffer storage space set corresponding to the first picking station, whether the fourth task information including the identifier of the above shelf is received is determined. If the fourth task information is not received, the executing body may generate the sixth transporting information, so that the automated guided vehicle transports the shelf to the shelf storage space in the warehouse.

In some alternative implementations of the present embodiment, a buffer storage space set may include at least one the first buffer storage space. The above method may also include the following steps not shown in FIG. 5: in response to determining that the third task information is not received, determining whether there is an idle first buffer storage space in the buffer storage space set corresponding to the first picking station; in response to determining that there is no idle first buffer storage space, determining whether there is a picking station in the warehouse that meets a condition as follows: the number of idle first buffer storage spaces in the buffer storage space set corresponding to this picking station is greater than a second preset value. In response to determining that there is the picking station that meets the condition, determining the position of the second buffer storage space in the buffer storage space set corresponding to the first picking station as the starting position, determining a position of a first buffer storage space in a buffer storage space set corresponding to the picking station that meets the condition as the end position, then generating seventh transporting information based on the determined starting position and the end position; and sending the seventh transporting information to the automated guided vehicle.

In the present implementation, if the executing body does not receive the third task information, the shelf needs to be transported from the second buffer storage space in the buffer storage space set corresponding to the first picking station to the first buffer storage space in the buffer storage space set corresponding to the first picking station. If there is no idle first buffer storage space in the buffer storage space set corresponding to the first picking station, it may be determined whether there is one another picking station in the warehouse having an idle first buffer storage space in the buffer storage space set corresponding thereto and the number of idle first buffer storage spaces being greater than the second preset value, the shelf may be transported to the idle first buffer storage space. That is, the position of the second buffer storage space in the buffer storage space set corresponding to the first picking station is used as the starting position, and the position of the first buffer storage space in the buffer storage space set corresponding to the one another picking station that meeting the condition is used as the end position. The starting position and the end position are encapsulated to generate the seventh transporting information. Finally, the seventh transporting information is sent to the automated guided vehicle.

In the present implementation, it may realize the sharing of the buffer storage spaces corresponding to different picking stations, increase the flexibility of shelf transporting, and may improve processing efficiency.

In the method for controlling shelf transporting provided by the above embodiment of the present disclosure, during processing the task information, the shelf may be transported to the first buffer storage space or the second buffer storage space, and while the shelf is at the above buffer storage space, it is detected whether new task information for the shelf is received. If the executing body has not completed the process on the current task information currently, it needs to compare the priority of the new task information with the priority of the currently being processed task information. If the priority of the new task information is higher, the new task information is processed first. If the priority of the new task information is lower, the executing body continues to processing the currently being processed task information. After the processing on the task information is completed, the shelf is in the second buffer storage space, and then is returned back to the first buffer storage space. In addition, it may be detected whether new task information for the shelf is received both when the shelf is in the second buffer storage space or the first buffer storage space. If yes, the shelf is directly transported to the first buffer storage space of the picking station processing the new task information to wait for processing. If not, the shelf is returned back to the shelf storage space. The method of the present embodiment increases the flexibility of the transporting process by dividing the process of transporting shelf into a plurality of sections; in addition, it detects whether new task information is received for a plurality of times at the buffer storage spaces, so as to facilitate the direct transporting of the shelf to other buffer storage spaces, which improves the hit rate of the shelf; since the shelf does not need to be returned every time, the traveling distance of the automated guided vehicle is reduced at the same time, and the processing efficiency is improved.

Figure 6:
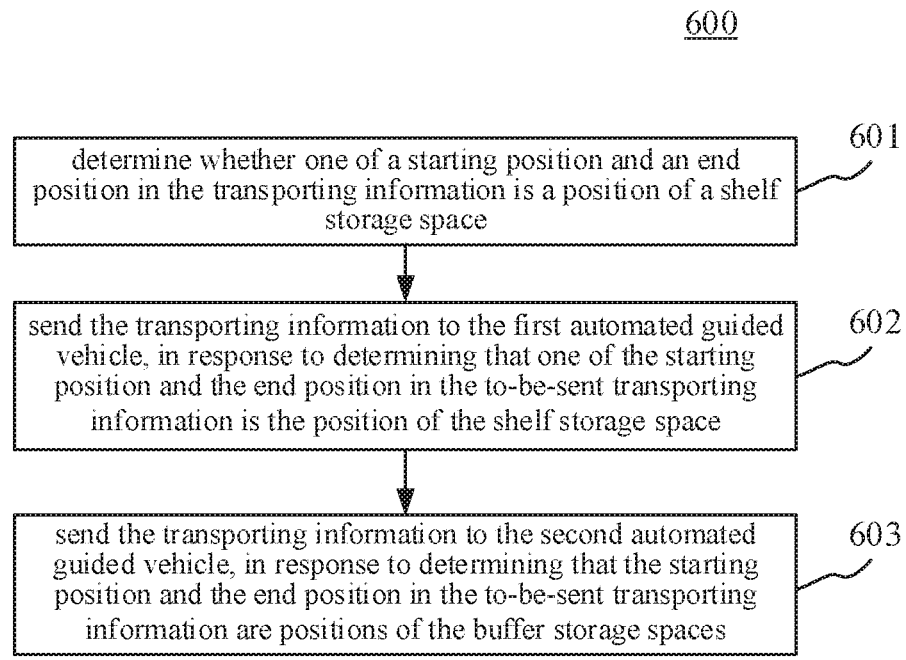
FIG. 6 is a flowchart of a method for controlling shelf transporting according to another embodiment of the present disclosure.

With further reference to FIG. 6, a flow 600 of a method for controlling shelf transporting according to another embodiment of the present disclosure is illustrated. In the present embodiment, the automated guided vehicle includes a first automated guided vehicle that travels between the shelf storage spaces and buffer storage spaces in the buffer storage space sets and a second automated guided vehicle that travels between buffer storage spaces. In the present embodiment, the first automated guided vehicle may travel between the shelf storage spaces and the first buffer storage spaces of the buffer storage spaces, and the second automated guided vehicle may travel between first buffer storage spaces and second buffer storage spaces in different buffer storage space sets, and between the first buffer storage spaces and the second buffer storage spaces of the same buffer storage space set. As shown in FIG. 6, before sending transporting information to an automated guided vehicle, the method for controlling shelf transporting of the present embodiment may further include the following steps:

Step 601, determining whether one of a starting position and an end position in the transporting information is a position of a shelf storage space.

The executing body may determine, after generating the transporting information, whether one of a starting position and an end position in the transporting information is a position of a shelf storage space.

Step 602, sending the transporting information to the first automated guided vehicle, in response to determining that one of the starting position and the end position in the to-be-sent transporting information is the position of the shelf storage space.

If one of the starting position and the end position in the to-be-sent transporting information is the position of the shelf storage space, it is determined that a transporting task indicated by the transporting information should be completed by the first automated guided vehicle. Then, the executing body sends the transporting information to a first automated guided vehicle.

Step 603, sending the transporting information to the second automated guided vehicle, in response to determining that the starting position and the end position in the to-be-sent transporting information are positions of the buffer storage spaces.

If the starting position and the end position are the positions of the buffer storage spaces, it is determined that the transporting task indicated by the transporting information should be completed by the second automated guided vehicle. Then, the executing body sends the transporting information to the second automated guided vehicle.

In the method for controlling shelf transporting provided by the above embodiment of the present disclosure, the transporting information may be sent to different types of automated guided vehicles based on the type of the transporting information, so that the automated guided vehicles may be effectively managed.

In some alternative implementations of the present embodiment, task information sent by the task server to a server may include warehouse-in task information and warehouse-out task information. Correspondingly, the picking stations set in the warehouse may include an warehouse-in picking station for processing the warehouse-in task information and a warehouse-out picking station for processing the warehouse-out task information. The method may further include the following steps: first, determining the number of automated guided vehicles in the warehouse, the number of the warehouse-in picking station, and the number of the warehouse-out picking station; in response to determining that a ratio of the number of the automated guided vehicles to a sum of the number of the warehouse-in picking station and the number of the warehouse-out picking station is greater than a first preset value, determining the number of the first automated guided vehicle that travels between the shelf storage spaces and the buffer storage spaces and the number of the second automated guided vehicle that travels between the buffer storage spaces based on a ratio of the number of the warehouse-in picking station to the number of the warehouse-out picking station and the number of the automated guided vehicles; and in response to determining that the ratio of the number of the automated guided vehicles to the sum of the number of the warehouse-in picking station and the number of the warehouse-out picking station is less than the first preset value, selecting automated guided vehicles of a number equal to the sum of the number of the warehouse-in picking station and the number of the warehouse-out picking station as the second automated guided vehicles that travel between the buffer storage spaces, and allocating the selected automated guided vehicles to the warehouse-in picking station and the warehouse-out picking station.

In the present implementation, the executing body may determine the number of automated guided vehicles in the warehouse n, the number of the warehouse-in picking station $m_1$, and the number of the warehouse-out picking station $m_2$, then, calculate the value of $n/(m_1+m_2)$, and determine whether the ratio is greater than the first preset value. If the ratio is greater than the first preset value, it means that there are more automated guided vehicles in the warehouse. Then, the number of the first automated guided vehicle and the number of the second automated guided vehicle may be determined based on $m_1/m_2$ and n. For example, using $n*m_1/m_2$ automated guided vehicles as the first automated guided vehicles, and using the remaining as the second automated guided vehicles. Or, using $n*m_1/(m_1+m_2)$ automated guided vehicles as the first automated guided vehicles, and using the remaining as the second automated guided vehicles. If the ratio is less than the first preset value, it means that the number of the automated guided vehicles in the warehouse is less. Then, $m_1+m_2$ automated guided vehicles may be selected as the first automated guided vehicles, and the remaining may be used as the second automated guided vehicles. Then, the first automated guided vehicles are allocated to the picking stations, so that each picking station corresponds to an automated guided vehicle, which is convenient for transporting the shelf from the first buffer storage space to the second buffer storage space, or transporting the shelf from the first buffer storage space of the picking station to the first buffer storage space or the second buffer storage space of one another picking stations.

Figure 7:
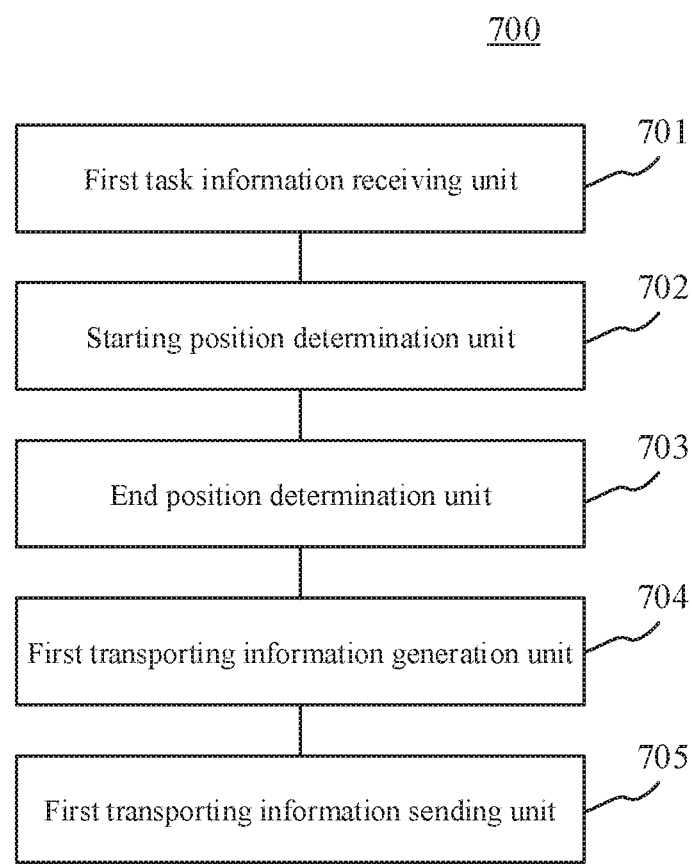
FIG. 7 is a schematic structural diagram of an apparatus for controlling shelf transporting according to an embodiment of the present disclosure.

With further reference to FIG. 7, as an implementation of the method shown in the above figures, the present disclosure provides an embodiment of an apparatus for controlling shelf transporting, and the apparatus embodiment corresponds to the method embodiment as shown in FIG. 3, and the apparatus may be specifically applied to various electronic devices.

As shown in FIG. 7, an apparatus 700 for controlling shelf transporting of the present embodiment includes: a first task information receiving unit 701, a starting position determination unit 702, an end position determination unit 703, a first transporting information generation unit 704 and a first transporting information sending unit 705.

The first task information receiving unit 701 is configured to receive first task information from a task server. The first task information includes an identifier of a to-be-transported shelf and an identifier of a first picking station processing the first task information, the to-be-transported shelf is stored in a warehouse, and the warehouse being set with shelf storage spaces, picking stations, and buffer storage space sets corresponding to the picking stations, each buffer storage space set including a first buffer storage space.

The starting position determination unit 702 is configured to determine, based on the identifier of the to-be-transported shelf, a position of a shelf storage space storing the shelf as a starting position.

The end position determination unit 703 is configured to determine, based on the identifier of the first picking station, a position of a first buffer storage space in a buffer storage space set corresponding to the first picking station as an end position.

The first transporting information generation unit 704 is configured to generate first transporting information, based on the determined starting position and the end position.

The first transporting information sending unit 705 is configured to send the first transporting information to send the first transporting information to an automated guided vehicle, so that the automated guided vehicle transports the shelf.

In some alternative implementations of the present embodiment, the first transporting information sending unit 705 may be further configured to: select an automated guided vehicle from an idle automated guided vehicle set as a target automated guided vehicle; and send the first transporting information to the target automated guided vehicle.

In some alternative implementations of the present embodiment, the buffer storage space set may further include a second buffer storage space. The apparatus 700 may further include a second task information receiving unit, a priority determination unit, a second transporting information generation unit and a second transporting information sending unit not shown in FIG. 7.

The second task information receiving unit is configured to determine, in a process of storing the shelf into the first buffer storage space in the buffer storage space set corresponding to the first picking station, whether second task information comprising the identifier of the shelf is received from the task server, wherein the second task information further comprises an identifier of a second picking station for processing the second task information.

The priority determination unit is configured to determine, in response to determining that the second task information is received, whether a priority of the second task information is higher than a priority of the first task information.

The second transporting information generation unit is configured to determine, in response to determining that the priority of the second task information is higher than the priority of the first task information, the position of the first buffer storage space in the buffer storage space set corresponding to the first picking station as a starting position, and determine, based on the identifier of the second picking station, a position of a second buffer storage space in a buffer storage space set corresponding to the second picking station as an end position; generate second transporting information based on the determined starting position and end position.

The second transporting information sending unit is configured to send the second transporting information to the automated guided vehicle.

In some alternative implementations of the present embodiment, the apparatus 700 may further include a third transporting information generation unit and a third transporting information sending unit not shown in FIG. 7.

The third transporting information generation unit is configured to determine, in response to determining that the second task information is not received or the priority of the second task information is lower than the priority of the first task information, the position of the first buffer storage space in the buffer storage space set corresponding to the first picking station as the starting position, determine a position of a second buffer storage space in the buffer storage space set corresponding to the first picking station as the end position, and generate third transporting information based on the determined starting position and the end position.

The third transporting information sending unit is configured to send the third transporting information to the automated guided vehicle.

In some alternative implementations of the present embodiment, the apparatus 700 may further include a third task information receiving unit, a fourth transporting information generation unit and a fourth transporting information sending unit not shown in FIG. 7.

The third task information receiving unit is configured to determine, in response to determining that information of completing task processing is received from a picking terminal, whether third task information comprising the identifier of the shelf is received from the task server in a process of storing the shelf into the second buffer storage space in the buffer storage space set corresponding to the first picking station, wherein the information of completing the task is sent by the picking terminal after completing the processing of the first task information, and the third task information further comprises an identifier of a third picking station for processing the third task information.

The fourth transporting information generation unit is configured to determine, in response to determining that the third task information is received, the position of the second buffer storage space in the buffer storage space set corresponding to the first picking station as a starting position, and determine a position of a first buffer storage space in a buffer storage space set corresponding to the third picking station as the end position based on the identifier of the third picking station; generate fourth transporting information based on the determined starting position and end position.

The fourth transporting information sending unit is configured to send the fourth transporting information to the automated guided vehicle.

In some alternative implementations of the present embodiment, the apparatus 700 may further include a fifth transporting information generation unit and a fifth transporting information sending unit not shown in FIG. 7.

The fifth transporting information generation unit is configured to determine, in response to determining that the third task information is not received, the position of the second buffer storage space in the buffer storage space set corresponding to the first picking station as a starting position, determine the position of the first buffer storage space in the buffer storage space set corresponding to the first picking station as an end position, and generate fifth transporting information based on the determined starting position and end position.

The fifth transporting information sending unit is configured to send the fifth transporting information to the automated guided vehicle.

In some alternative implementations of the present embodiment, the apparatus 700 may further include a fourth task information receiving unit, a sixth transporting information generation unit and a sixth transporting information sending unit not shown in FIG. 7.

The fourth task information receiving unit is configured to determine, in the process of storing the shelf into the first buffer storage space in the buffer storage space set corresponding to the first picking station, whether fourth task information including the identifier of the shelf is received.

The sixth transporting information generation unit is configured to determine, in response to determining that the fourth task information is not received, the position of the first buffer storage space in the buffer storage space set corresponding to the first picking station as the starting position, determine the position of the shelf storage space storing the shelf as an end position, in response to determining that the fourth task information is not received, and generate sixth transporting information based on the determined starting position and end position.

The sixth transporting information sending unit is configured to send the sixth transporting information to the automated guided vehicle.

In some alternative implementations of the present embodiment, the automated guided vehicle includes a first automated guided vehicle that travels between shelf storage spaces and buffer storage spaces in the buffer storage space sets. The apparatus 700 may further include a position determination unit and a first automated guided vehicle determination unit not shown in FIG. 7.

The position determination unit is configured to determine, before sending transporting information to the automated guided vehicle, whether one of a starting position and an end position in the transporting information is a position of a shelf storage space.

The first automated guided vehicle determination unit is configured to send the transporting information to the first automated guided vehicle, in response to determining that one of the starting position and the end position in the to-be-sent transporting information is the position of the shelf storage space.

In some alternative implementations of the present embodiment, the automated guided vehicle includes the first automated guided vehicle that travels back and forth between the shelf storage space and the buffer storage space in the buffer storage space set. The apparatus 700 may further include a second automated guided vehicle determination unit not shown in FIG. 7, configured to send the transporting information to the second automated guided vehicle, in response to determining that the starting position and the end position in the to-be-sent transporting information are positions of the buffer storage spaces.

In some alternative implementations of the present embodiment, task information sent by the task server to a server includes warehouse-in task information and warehouse-out task information, the picking stations set in the warehouse comprise a warehouse-in picking station for processing the warehouse-in task information and an warehouse-out picking station for processing the warehouse-out task information. The apparatus 700 may further include a number determination unit, a first allocation unit and a second allocation unit not shown in FIG. 7.

The number determination unit is configured to determine the number of automated guided vehicles in the warehouse, the number of the warehouse-in picking station, and the number of the warehouse-out picking station.

The first allocation unit is configured to determine in response to determining that a ratio of the number of the automated guided vehicles to a sum of the number of the warehouse-in picking station and the number of the warehouse-out picking station is greater than a first preset value, a number of the first automated guided vehicle traveling between the shelf storage spaces and the buffer storage spaces and a number of the second automated guided vehicle traveling between the buffer storage spaces based on a ratio of the number of the warehouse-in picking station to the number of the warehouse-out picking station and the number of the automated guided vehicles.

The second allocation unit is configured to select, in response to determining that the ratio of the number of the automated guided vehicles to the sum of the number of the warehouse-in picking station and the number of the warehouse-out picking station is less than the first preset value, automated guided vehicles of a number equal to the sum of the number of the warehouse-in picking station and the number of the warehouse-out picking station as the second automated guided vehicles traveling back and forth between the buffer storage spaces, and allocate the selected automated guided vehicles to the warehouse-in picking station and the warehouse-out picking station.

In some alternative implementations of the present embodiment, the buffer storage space set includes at least one the first buffer storage space. The apparatus 700 may further include an idle buffer storage space determination unit, an idle buffer storage space selection unit, a seventh transporting information generation unit and a seventh transporting information sending unit not shown in FIG. 7.

The idle buffer storage space determination unit is configured to determine, in response to determining that the third task information is not received, whether there is an idle first buffer storage space in the buffer storage space set corresponding to the first picking station.

The idle buffer storage space selection unit is configured to determine, in response to determining that there is no idle first buffer storage space, whether there is a picking station in the warehouse meeting a condition as follows: a number of idle first buffer storage spaces in a buffer storage space set corresponding to the picking station is greater than a second preset value.

The seventh transporting information generation unit is configured to determine, in response to determining that there is the picking station meeting the condition, the position of the second buffer storage space in the buffer storage space set corresponding to the first picking station as a starting position, determine a position of a first buffer storage space in a buffer storage space set corresponding to the picking station meeting the condition as an end position, and generate seventh transporting information based on the determined starting position and end position.

The seventh transporting information sending unit is configured to send the seventh transporting information to the automated guided vehicle.

The apparatus for controlling shelf transporting provided by above embodiments of the present disclosure, after receiving the first task information from the task server, may determine the position of the shelf storage space storing the shelf as the starting position based on the identifier of the to-be-transported shelf, then determine, based on the identifier of the first picking station, the position of the first buffer storage space in the buffer storage space set corresponding to the first picking station as the end position, generate the first transporting information based on the starting position and the end position, and send the generated first transporting information to the automated guided vehicle, so that the automated guided vehicle transports the shelf. In the apparatus of the present embodiment, by setting buffer storage spaces in the warehouse, a transporting route is discomposed into a plurality of sections, so that the automated guided vehicle may be more fully used.

It should be understood that the units 701 to 705 described in the apparatus 700 for controlling shelf transporting correspond to the steps in the method described with reference to FIG. 3 respectively. Therefore, the operations and features described above for the method for controlling shelf transporting are also applicable to the apparatus 700 and the units contained therein, and detailed description thereof will be omitted.

Figure 8:
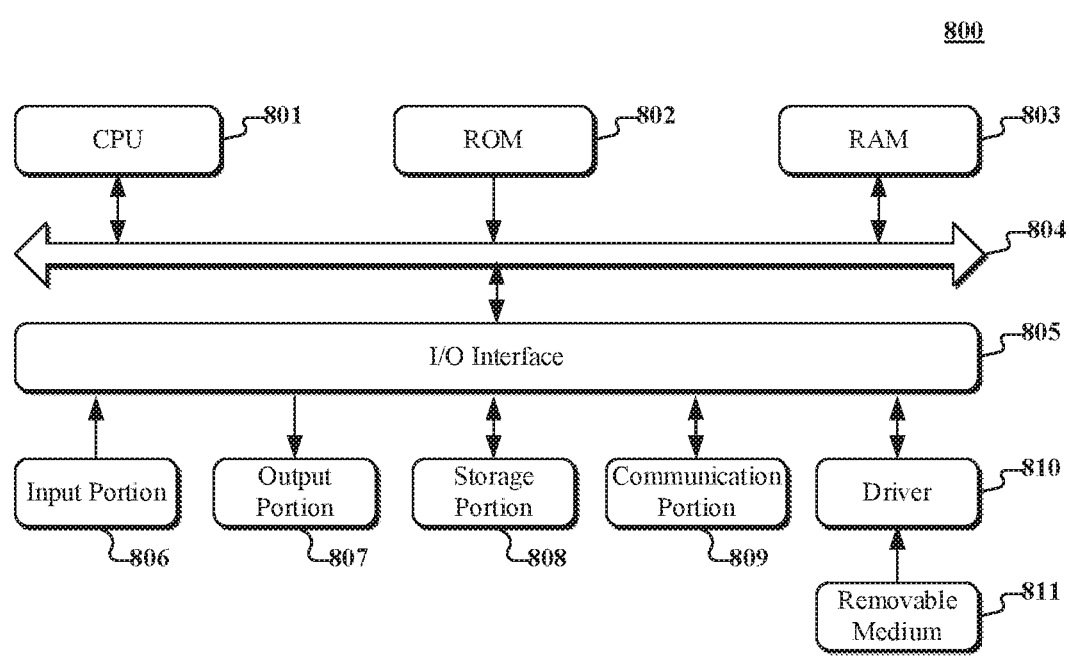
FIG. 8 is a schematic structural diagram of a computer system of a server suitable for implementing embodiments of the present disclosure.

With further reference to FIG. 8, a schematic structural diagram of a computer system 800 of a server suitable for implementing embodiments of the present disclosure is shown. The server shown in FIG. 8 is merely an example, and should not impose any limitation on the function and scope of use of embodiments of the present disclosure.

As shown in FIG. 8, the computer system 600 includes a central processing unit (CPU) 801, which may execute various appropriate actions and processes in accordance with a program stored in a read-only memory (ROM) 802 or a program loaded into a random access memory (RAM) 803 from a storage portion 808. The RAM 803 also stores various programs and data required by operations of the system 800. The CPU 801, the ROM 802 and the RAM 803 are connected to each other through a bus 804. An input/output (I/O) interface 805 is also connected to the bus 804.

The following components are connected to the I/O interface 805: an input portion 806 including such as a keyboard, a mouse; an output portion 807 including such as a cathode ray tube (CRT), a liquid crystal display (LCD) and a speaker; the storage portion 808 including a hard disk and the like; and a communication portion 809 including a network interface card, such as a LAN card and a modem. The communication portion 809 performs communication processes via a network, such as the Internet. A driver 810 is also connected to the I/O interface 805 as required. A removable medium 811, such as a magnetic disk, an optical disk, a magneto-optical disk, and a semiconductor memory, may be installed on the driver 810, to facilitate the retrieval of a computer program from the removable medium 811, and the installation thereof on the storage portion 808 as needed.

In particular, according to embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 809, and/or may be installed from the removable medium 811. The computer program, when executed by the central processing unit (CPU) 801, implements the above mentioned functionalities as defined by the method of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above.

In some embodiments of the present disclosure, the computer readable storage medium may be any tangible medium containing or storing programs which can be used by a command execution system, apparatus or element or incorporated thereto. In embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user'a computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions The units involved in the embodiments of the present disclosure may be implemented by means of software or hardware. The described units may also be provided in a processor, for example, may be described as: a processor including a first task information receiving unit, a starting position determination unit, an end position determination unit, a first transporting information generation unit and a first transporting information sending unit. Here, the names of these units do not in some cases constitute limitations to such units themselves. For example, the first task information receiving unit may also be described as "a unit configured to receive first task information from a task server".

In another aspect, embodiments of the present disclosure further provide a computer readable medium. The computer readable medium may be included in the apparatus in the above described embodiments, or a stand-alone computer readable medium not assembled into the apparatus. The computer readable medium carries one or more programs. The one or more programs, when executed by the apparatus, cause the apparatus to: receive first task information from a task server, the first task information including an identifier of a to-be-transported shelf and an identifier of a first picking station processing the first task information, the to-be-transported shelf being stored in a warehouse, and the warehouse being set with shelf storage spaces, picking stations, and buffer storage space sets corresponding to the picking stations, each buffer storage space set including a first buffer storage space; determine, based on the identifier of the to-be-transported shelf, a position of a shelf storage space storing the shelf as a starting position; determine, based on the identifier of the first picking station, a position of a first buffer storage space in a buffer storage space set corresponding to the first picking station as an end position; generate first transporting information, based on the determined starting position and the end position; and send the first transporting information to an automated guided vehicle, so that the automated guided vehicle conveys the shelf.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A computer-implemented method for controlling shelf transporting within a warehouse, the warehouse being set with shelf storage spaces storing shelves, picking stations comprising a first picking station and a second picking station, a first buffer storage space set corresponding to the first picking station, and a second buffer storage space set corresponding to the second picking station, each buffer storage space set comprising a first buffer storage space and a second buffer storage space, the second buffer storage space in the first buffer storage space set being set around the first picking station, and the second buffer storage space in the second buffer storage space set being set around the second picking station, the method comprising:

receiving first task information from a task server, the first task information comprising an identifier of a shelf in the shelf storage spaces and an identifier of the first picking station for processing the first task information;

determining, based on the identifier of the shelf, a position of a shelf storage space storing the shelf as a starting position;

determining, based on the identifier of the first picking station, a position of a first buffer storage space in the first buffer storage space set corresponding to the first picking station as an end position;

generating first transporting information, based on the determined starting position and end position;

sending the first transporting information to an automated guided vehicle (AGV), so that the AGV transports the shelf from the position of the shelf storage space storing the shelf to the position of the first buffer storage space in the first buffer storage space set corresponding to the first picking station, during the shelf being stored into the first buffer storage space in the first buffer storage space set corresponding to the first picking station, generating a second transporting instruction to instruct the AGV to transport the shelf from the first buffer storage space in the first buffer storage space set corresponding to the first picking station to a second buffer storage space in the second buffer storage space set corresponding to the second picking station, in response to determining that second task information comprising the identifier of the shelf and an identifier of the second picking station is received and a priority of the second task information is higher than a priority of the first task information, and after process on the second task information is completed at the second picking station, generating a transporting instruction to instruct the AGV to transport the shelf from the second buffer storage space in the second buffer storage space set corresponding to the second picking station back to the first picking station for the first task information continues to be processed at the first picking station;

during the shelf being stored into the first buffer storage space in the first buffer storage space set corresponding to the first picking station, generating a third transporting instruction to instruct the AGV to transport the shelf from the first buffer storage space in the first buffer storage space set corresponding to the first picking station to a second buffer storage space in the first buffer storage space set corresponding to the first picking station, in response to determining that the second task information is not received or the priority of the second task information is lower than the priority of the first task information.

2. The method according to claim 1, wherein the generating an instruction to instruct the AGV to transport the shelf from the first buffer storage space in the first buffer storage space set corresponding to the first picking station to a second buffer storage space in the second buffer storage space set corresponding to the second picking station, comprises:

determining, during the shelf being stored into the first buffer storage space in the first buffer storage space set corresponding to the first picking station, whether the second task information comprising the identifier of the shelf is received from the task server, wherein the second task information further comprises the identifier of the second picking station for processing the second task information;

in response to determining that the second task information is received, determining whether the priority of the second task information is higher than the priority of the first task information;

in response to determining that the priority of the second task information is higher than the priority of the first task information, determining the position of the first buffer storage space in the first buffer storage space set corresponding to the first picking station as a starting position, and determining, based on the identifier of the second picking station, a position of the second buffer storage space in the second buffer storage space set corresponding to the second picking station as an end position; generating second transporting information based on the determined starting position and end position; and sending the second transporting information to the AGV.

3. The method according to claim 2, wherein the method further comprises:

in response to determining that the second task information is not received or the priority of the second task information is lower than the priority of the first task information, determining the position of the first buffer storage space in the first buffer storage space set corresponding to the first picking station as the starting position, determining a position of a second buffer storage space in the first buffer storage space set corresponding to the first picking station as the end position, and generating third transporting information based on the determined starting position and the end position; and sending the third transporting information to the AGV.

4. The method according to claim 3, wherein the method further comprises:

in response to determining that information of completing task processing is received from a picking terminal, determining whether third task information comprising the identifier of the shelf is received from the task server during the shelf being stored into the second buffer storage space in the first buffer storage space set corresponding to the first picking station, wherein the information of completing the task is sent by the picking terminal after completing the processing of the first task information, and the third task information further comprises an identifier of a third picking station for processing the third task information;

in response to determining that the third task information is received, determining the position of the second buffer storage space in the first buffer storage space set corresponding to the first picking station as a starting position, and determining, based on the identifier of the third picking station, a position of a first buffer storage space in a third buffer storage space set corresponding to the third picking station as an end position;

generating fourth transporting information based on the determined starting position and end position; and sending the fourth transporting information to the AGV.

5. The method according to claim 4, wherein the method further comprises:

in response to determining that the third task information is not received, determining the position of the second buffer storage space in the first buffer storage space set corresponding to the first picking station as a starting position, determining the position of the first buffer storage space in the first buffer storage space set corresponding to the first picking station as an end position, and generating fifth transporting information based on the determined starting position and end position; and sending the fifth transporting information to the AGV.

6. The method according to claim 5, wherein the method further comprises:

determining, during the shelf being stored into the first buffer storage space in the first buffer storage space set corresponding to the first picking station, whether fourth task information comprising the identifier of the shelf is received;

in response to determining that the fourth task information is not received, determining the position of the first buffer storage space in the first buffer storage space set corresponding to the first picking station as a starting position, determining the position of the shelf storage space storing the shelf as an end position, and generating sixth transporting information based on the determined starting position and end position; and
sending the sixth transporting information to the AGV.

7. The method according to claim 1, wherein the AGV comprises a first AGV traveling between the shelf storage spaces and buffer storage spaces in the buffer storage space sets; and
before sending transporting information to the AGV, the method further comprises:
determining whether one of a starting position and an end position in the transporting information is a position of a shelf storage space; and
sending the transporting information to the first AGV, in response to determining that one of the starting position and the end position in the to-be-sent transporting information is the position of the shelf storage space.

8. The method according to claim 7, wherein the AGV further comprises a second AGV that travels between buffer storage spaces; and
the method further comprises:
sending the transporting information to the second AGV, in response to determining that the starting position and the end position in the to-be-sent transporting information are positions of the buffer storage spaces.

9. The method according to claim 1, wherein task information sent by the task server to a server comprises warehouse-in task information and warehouse-out task information, the picking stations set in the warehouse comprise a warehouse-in picking station for processing the warehouse-in task information and a warehouse-out picking station for processing the warehouse-out task information; and
the method further comprises:
determining a number of AGVs in the warehouse, a number of the warehouse-in picking station, and a number of the warehouse-out picking station;
in response to determining that a ratio of the number of the AGVs to a sum of the number of the warehouse-in picking station and the number of the warehouse-out picking station is greater than a first preset value, determining a number of the first AGV traveling between the shelf storage spaces and the buffer storage spaces and a number of the second AGV traveling between the buffer storage spaces based on a ratio of the number of the warehouse-in picking station to the number of the warehouse-out picking station and the number of the AGVs; and
in response to determining that the ratio of the number of the AGVs to the sum of the number of the warehouse-in picking station and the number of the warehouse-out picking station is less than the first preset value, selecting AGVs of a number equal to the sum of the number of the warehouse-in picking station and the number of the warehouse-out picking station as the second AGVs traveling between the buffer storage spaces, and allocating the selected AGVs to the warehouse-in picking station and the warehouse-out picking station.

10. The method according to claim 4, wherein each buffer storage space set comprises at least one the first buffer storage space; and
the method further comprises:
in response to determining that the third task information is not received, determining whether there is an idle first buffer storage space in the first buffer storage space set corresponding to the first picking station;
in response to determining that there is no idle first buffer storage space, determining whether there is a picking station in the warehouse meeting a condition as follows: a number of idle first buffer storage spaces in a buffer storage space set corresponding to the picking station is greater than a second preset value;
in response to determining that there is the picking station meeting the condition, determining the position of the second buffer storage space in the first buffer storage space set corresponding to the first picking station as a starting position, determining a position of a first buffer storage space in a buffer storage space set corresponding to the picking station meeting the condition as an end position, and generating seventh transporting information based on the determined starting position and end position; and
sending the seventh transporting information to the AGV.

11. An apparatus for controlling shelf transporting, the apparatus comprising:
at least one processor; and
a memory storing instructions, the instructions when executed by the at least one processor, causing the at least one processor to perform operations for controlling shelf transporting within a warehouse, the warehouse being set with shelf storage spaces storing shelves, picking stations comprising a first picking station and a second picking station, a first buffer storage space set corresponding to the first picking station, and a second buffer storage space set corresponding to the second picking station, each buffer storage space set comprising a first buffer storage space and a second buffer storage space, the second buffer storage space in the first buffer storage space set being set around the first picking station, and the second buffer storage space in the second buffer storage space set being set around the second picking station,, the operations comprising:
receiving first task information from a task server, the first task information comprising an identifier of a shelf in the shelf storage spaces and an identifier of the first picking station for processing the first task information;
determining, based on the identifier of the shelf, a position of a shelf storage space storing the shelf as a starting position;
determining, based on the identifier of the first picking station, a position of a first buffer storage space in the first buffer storage space set corresponding to the first picking station as an end position;
generating first transporting information, based on the determined starting position and end position;
sending the first transporting information to an automated guided vehicle (AGV), so that the AGV transports the shelf from the position of the shelf storage space storing the shelf to the position of the first buffer storage space in the first buffer storage space set corresponding to the first picking station,
during the shelf being stored into the first buffer storage space in the first buffer storage space set corresponding to the first picking station, generating a second transporting instruction to instruct the AGV to transport the shelf from the first buffer storage space in the first buffer storage space set corresponding to the first picking station to a second buffer storage space in the second buffer storage space set corresponding to the second picking station, in response to determining that second task information comprising the identifier of the shelf and an identifier of the second picking station is received and a priority of the second task information is higher than a priority of the first task information, and after process on the second task information is completed at the second picking station, generating a transporting instruction to instruct the AGV to transport the shelf from the second buffer storage space in the second buffer storage space set corresponding to the second picking station back to the first picking station for the first task information continues to be processed at the first picking station;

during the shelf being stored into the first buffer storage space in the first buffer storage space set corresponding to the first picking station, generating a third transporting instruction to instruct the AGV to transport the shelf from the first buffer storage space in the first buffer storage space set corresponding to the first picking station to a second buffer storage space in the first buffer storage space set corresponding to the first picking station, in response to determining that the second task information is not received or the priority of the second task information is lower than the priority of the first task information.

12. The apparatus according to claim 11, wherein the generating an instruction to instruct the AGV to transport the shelf from the first buffer storage space in the first buffer storage space set corresponding to the first picking station to a second buffer storage space in the second buffer storage space set corresponding to the second picking station, comprises:

determining, during the shelf being stored into the first buffer storage space in the first buffer storage space set corresponding to the first picking station, whether the second task information comprising the identifier of the shelf is received from the task server, wherein the second task information further comprises the identifier of the second picking station for processing the second task information;

determining, in response to determining that the second task information is received, whether the priority of the second task information is higher than the priority of the first task information;

determining, in response to determining that the priority of the second task information is higher than the priority of the first task information, the position of the first buffer storage space in the first buffer storage space set corresponding to the first picking station as a starting position, and determining, based on the identifier of the second picking station, a position of the second buffer storage space in the second buffer storage space set corresponding to the second picking station as an end position; generating second transporting information based on the determined starting position and end position; and sending the second transporting information to the AGV.

13. The apparatus according to claim 12, wherein the operations further comprise:

in response to determining that the second task information is not received or the priority of the second task information is lower than the priority of the first task information, determining the position of the first buffer storage space in the first buffer storage space set corresponding to the first picking station as the starting position, determining a position of a second buffer storage space in the first buffer storage space set corresponding to the first picking station as the end position, and generating third transporting information based on the determined starting position and the end position; and sending the third transporting information to the AGV.

14. The apparatus according to claim 13, wherein the operations further comprise:

in response to determining that information of completing task processing is received from a picking terminal, determining whether third task information comprising the identifier of the shelf is received from the task server during the shelf being stored into the second buffer storage space in the first buffer storage space set corresponding to the first picking station, wherein the information of completing the task is sent by the picking terminal after completing the processing of the first task information, and the third task information further comprises an identifier of a third picking station for processing the third task information;

in response to determining that the third task information is received, determining the position of the second buffer storage space in the first buffer storage space set corresponding to the first picking station as a starting position, and determining a position of a first buffer storage space in a third buffer storage space set corresponding to the third picking station as the end position based on the identifier of the third picking station;

generating fourth transporting information based on the determined starting position and end position; and sending the fourth transporting information to the AGV.

15. The apparatus according to claim 14, wherein the operations further comprise:

in response to determining that the third task information is not received, determining the position of the second buffer storage space in the first buffer storage space set corresponding to the first picking station as a starting position, determining the position of the first buffer storage space in the first buffer storage space set corresponding to the first picking station as an end position, and generating fifth transporting information based on the determined starting position and end position; and sending the fifth transporting information to the AGV.

16. The apparatus according to claim 15, wherein the operations further comprise:

determining, during the shelf being stored into the first buffer storage space in the first buffer storage space set corresponding to the first picking station, whether fourth task information comprising the identifier of the shelf is received;

determining, in response to determining that the fourth task information is not received, the position of the first buffer storage space in the firs buffer storage space set corresponding to the first picking station as the starting position, determining the position of the shelf storage space storing the shelf as an end position, and generating sixth transporting information based on the determined starting position and end position; and sending the sixth transporting information to the AGV.

17. The apparatus according to claim 11, wherein the AGV comprises a first AGV traveling between the shelf storage spaces and buffer storage spaces in the buffer storage space sets; and the operations further comprise:

determining whether one of a starting position and an end position in the transporting information is a position of a shelf storage space; and sending the transporting information to the first AGV, in response to determining that one of the starting position and the end position in the to-be-sent transporting information is the position of the shelf storage space.

18. A non-transitory computer readable medium, storing a computer program thereon, the program, when executed by a processor, cause the process to implement operations for controlling shelf transporting within a warehouse, the warehouse being set with shelf storage spaces storing shelves, picking stations comprising a first picking station and a second picking station, a first buffer storage space set corresponding to the first picking station, and a second buffer storage space set corresponding to the second picking station, each buffer storage space set comprising a first buffer storage space and a second buffer storage space, the second buffer storage space in the first buffer storage space set being set around the first picking station, and the second buffer storage space in the second buffer storage space set being set around the second picking station, wherein the operations comprise:

receiving first task information from a task server, the first task information comprising an identifier of a shelf in the shelf storage spaces and an identifier of the first picking station for processing the first task information;

determining, based on the identifier of the shelf, a position of a shelf storage space storing the shelf as a starting position;

determining, based on the identifier of the first picking station, a position of a first buffer storage space in the first buffer storage space set corresponding to the first picking station as an end position;

generating first transporting information, based on the determined starting position and end position;

sending the first transporting information to an AGV, so that the AGV transports the shelf from the position of the shelf storage space storing the shelf to the position of the first buffer storage space in the first buffer storage space set corresponding to the first picking station, during the shelf being stored into the first buffer storage space in the first buffer storage space set corresponding to the first picking station, generating a second transporting instruction to instruct the AGV to transport the shelf from the first buffer storage space in the first buffer storage space set corresponding to the first picking station to a second buffer storage space in the second buffer storage space set corresponding to the second picking station, in response to determining that second task information comprising the identifier of the shelf and an identifier of the second picking station is received and a priority of the second task information is higher than a priority of the first task information, and after process on the second task information is completed at the second picking station, generating a transporting instruction to instruct the AGV to transport the shelf from the second buffer storage space in the second buffer storage space set corresponding to the second picking station back to the first picking station for the first task information continues to be processed at the first picking station;

during the shelf being stored into the first buffer storage space in the first buffer storage space set corresponding to the first picking station, generating a third transporting instruction to instruct the AGV to transport the shelf from the first buffer storage space in the first buffer storage space set corresponding to the first picking station to a second buffer storage space in the first buffer storage space set corresponding to the first picking station, in response to determining that the second task information is not received or the priority of the second task information is lower than the priority of the first task information.

* * * * *